United States Patent
Chavali et al.

(10) Patent No.: US 12,539,862 B2
(45) Date of Patent: Feb. 3, 2026

(54) METHOD AND SYSTEM FOR LANE TRACKING FOR AN AUTONOMOUS VEHICLE

(71) Applicant: Continental Autonomous Mobility Germany GmbH, Ingolstadt (DE)

(72) Inventors: Pothuraju Chavali, Bangalore (IN); Sri Hari Bhupala Haribhakta, Bangalore (IN); Muralikrishna Sridhar, Munich (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 141 days.

(21) Appl. No.: 18/696,084

(22) PCT Filed: Sep. 27, 2022

(86) PCT No.: PCT/EP2022/076759
§ 371 (c)(1),
(2) Date: Mar. 27, 2024

(87) PCT Pub. No.: WO2023/046975
PCT Pub. Date: Mar. 30, 2023

(65) Prior Publication Data
US 2025/0128714 A1    Apr. 24, 2025

(30) Foreign Application Priority Data

Sep. 27, 2021 (IN) ............................. 202141043726
Nov. 26, 2021 (GB) ..................................... 2117061

(51) Int. Cl.
*B60W 40/072* (2012.01)
*B60W 30/12* (2020.01)
(Continued)

(52) U.S. Cl.
CPC ........... *B60W 40/072* (2013.01); *G06N 3/045* (2023.01); *G06V 20/588* (2022.01); *B60W 30/12* (2013.01)

(58) Field of Classification Search
CPC .... B60W 40/072; B60W 30/12; G06N 3/045; G06V 20/588; G06V 10/82;
(Continued)

(56) References Cited

U.S. PATENT DOCUMENTS

| 5,485,378 A | * | 1/1996 | Franke | ................ B62D 15/025 701/41 |
| 6,718,259 B1 | * | 4/2004 | Khosla | ................... G01C 21/26 701/96 |

(Continued)

FOREIGN PATENT DOCUMENTS

JP    2016057750 A    4/2016

OTHER PUBLICATIONS

Notice of Reasons for Refusal proposed on Feb. 14, 2025 for the counterpart Japanese Patent Application No. 2024-518850 and machine translation of same.
(Continued)

*Primary Examiner* — Krishnan Ramesh
(74) *Attorney, Agent, or Firm* — Fitch, Even, Tabin & Flannery LLP

(57) ABSTRACT

Disclosed subject matter relates to field of autonomous vehicles that discloses method and system for training a lane tracking system and lane tracking for an autonomous vehicle. During training phase, lane tracking system receives ground truth and measured values corresponding to lane boundary detection points and determines ground truth and measured clothoid points. Thereafter, coefficient values of clothoid parameters are determined for measured clothoid points to model lane boundaries and then Kalman filter
(Continued)

parameters are determined for coefficient values to track lane boundaries, using at least one neural network. Further, coefficient values of clothoid parameters are updated using Kalman filter parameters, using which, measured clothoid point is reconstructed, and used to track lane boundaries. Further, training error is obtained by L2 norm between clothoid points and not by coefficients, thereby enhancing training error minimization. The trained lane tracking system is then deployed for lane tracking in the dynamic environment.

20 Claims, 9 Drawing Sheets

(51) Int. Cl.
  *G06N 3/045* (2023.01)
  *G06V 20/56* (2022.01)
(58) Field of Classification Search
  CPC . G06T 2207/20081; G06T 2207/20084; G06T 2207/30256; G06T 7/136; G06T 7/277
  USPC .......................................................... 701/23
  See application file for complete search history.

(56) References Cited

U.S. PATENT DOCUMENTS

| | | | | |
|---|---|---|---|---|
| 10,286,909 | B2* | 5/2019 | Fu | B60W 30/12 |
| 10,300,921 | B2* | 5/2019 | Carlsson | G06V 20/588 |
| 10,650,253 | B2* | 5/2020 | Bayer | G06F 18/253 |
| 10,691,943 | B1* | 6/2020 | Ferstl | G06V 20/17 |
| 10,867,190 | B1* | 12/2020 | Vajna | G06T 7/593 |
| 11,195,418 | B1* | 12/2021 | Hong | G01C 21/3602 |
| 11,630,197 | B2* | 4/2023 | Unnikrishnan | G06F 18/23 |
| | | | | 382/104 |
| 2003/0100992 | A1* | 5/2003 | Khosla | G01S 7/411 |
| | | | | 701/514 |
| 2005/0187705 | A1* | 8/2005 | Niwa | B60W 30/00 |
| | | | | 701/448 |
| 2009/0248768 | A1* | 10/2009 | Fukumoto | G01C 21/3837 |
| | | | | 708/290 |
| 2013/0173232 | A1* | 7/2013 | Meis | G08G 1/167 |
| | | | | 703/2 |
| 2013/0177211 | A1* | 7/2013 | Watanabe | G06V 20/588 |
| | | | | 382/103 |
| 2015/0057922 | A1* | 2/2015 | Yabe | G09B 29/106 |
| | | | | 701/437 |
| 2019/0130182 | A1* | 5/2019 | Zang | G06V 20/182 |
| 2019/0344787 | A1* | 11/2019 | Pietzsch | G06T 7/73 |
| 2020/0110416 | A1* | 4/2020 | Hong | G06N 20/00 |
| 2020/0216076 | A1* | 7/2020 | Otto | G08G 1/167 |
| 2020/0307612 | A1* | 10/2020 | Nakamura | B60W 40/072 |
| 2021/0001860 | A1* | 1/2021 | Kawasaki | G06N 3/0499 |
| 2021/0295685 | A1* | 9/2021 | Lee | G08G 1/096775 |
| 2021/0319588 | A1* | 10/2021 | Yuan | G06F 17/16 |
| 2021/0394745 | A1* | 12/2021 | Mujumdar | B60W 60/0011 |
| 2022/0082390 | A1* | 3/2022 | Kameoka | G01C 21/3848 |
| 2022/0101637 | A1* | 3/2022 | Keidel | G06V 20/588 |
| 2022/0169280 | A1* | 6/2022 | Brown | B60W 60/001 |
| 2022/0383535 | A1* | 12/2022 | Su | G06V 10/443 |
| 2023/0122011 | A1* | 4/2023 | Ishimaru | G06T 7/73 |
| | | | | 348/148 |

OTHER PUBLICATIONS

Intellectual Property Office Search Report dated Jul. 11, 2022 for the priority GB Application No. GB2117061.8.
The International Search Report and the Written Opinion of the International Searching Authority mailed on Feb. 2, 2023 for the PCT Application No. PCT/EP2022/076759 which this application claims priority.
Huseyin Coskun et al., "Long Short-Term Memory Kalman Filters: Recurrent Neural Estimators for Pose Regularization", 2017 IEEE International Conference on Computer Vision (ICCV), Date of Conference: Oct. 22-29, 2017, DOI: 10.1109/ICCV.2017.589.
Young-Woo et al., "Detection and Tracking of Boundary of Unmarked Roads", 17th International Conference on Information Fusion (FUSION), Date of Conference: Jul. 7-10, 2014, Electronic ISBN:978-8-4901-2355-3.
Jigang Tang et al., "A review of lane detection methods based on deep learning", Pattern Recognition, vol. 111, Mar. 2021, 107623, https://doi.org/10.1016/j.patcog.2020.107623.
Heidi Loose et al., "Kalman Particle Filter for lane recognition on rural roads", 2009 IEEE Intelligent Vehicles Symposium, Date of Conference: Jun. 3-5, 2009, DOI: 10.1109/IVS.2009.5164253.

* cited by examiner

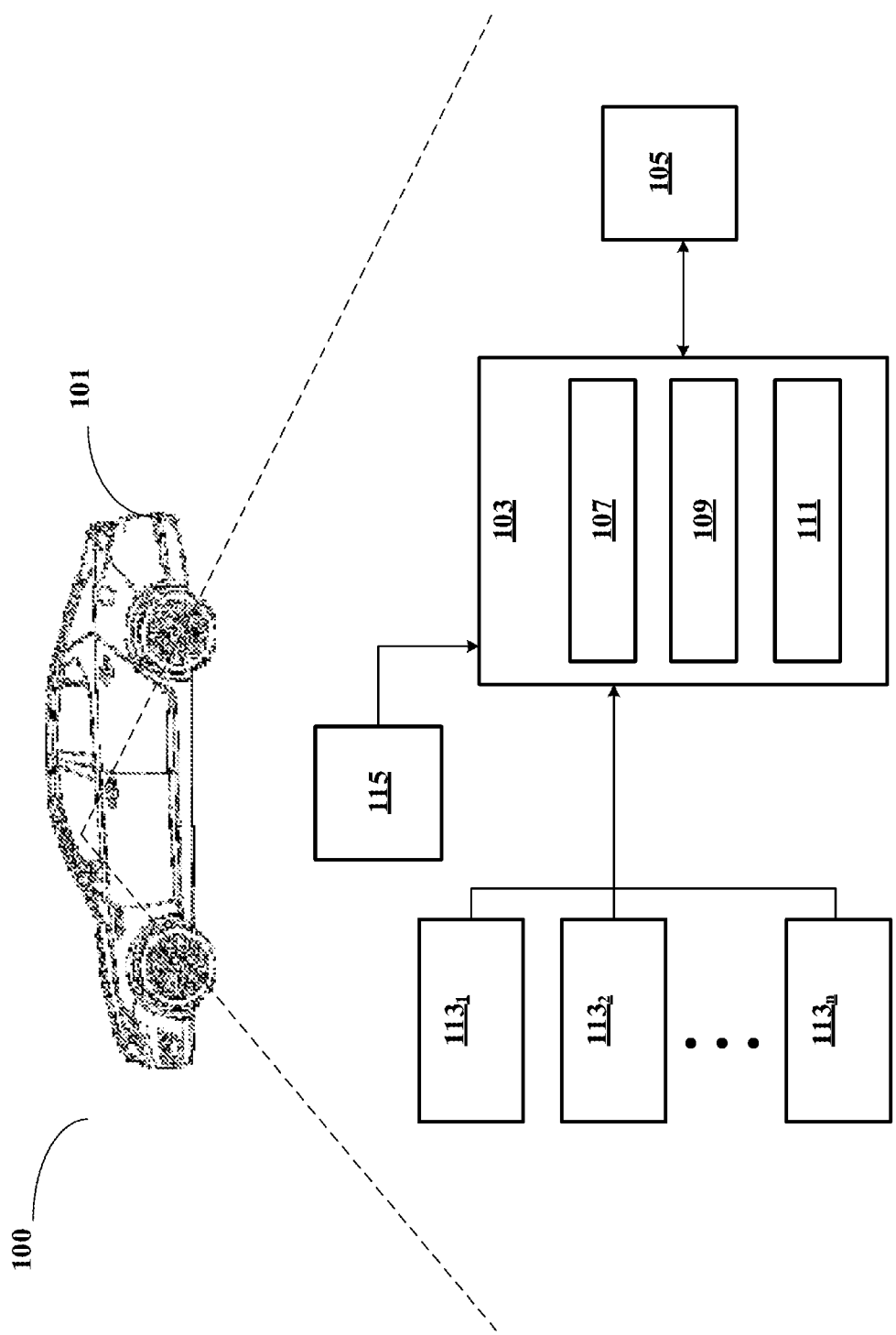

METHOD AND SYSTEM FOR LANE TRACKING FOR AN AUTONOMOUS VEHICLE

CROSS-REFERENCE TO RELATED APPLICATIONS

The present application is a National Stage Application under 35 U.S.C. § 371 of International Patent Application No. PCT/EP2022/076759 filed on Sep. 27, 2022, and claims priority from Indian Patent Application number 202141043726 filed on Sep. 27, 2021, in the Indian Intellectual Property Office, and United Kingdom Patent Application No. GB2117061.8 filed on Nov. 26, 2021 in the United Kingdom Intellectual Property Office, the disclosures of which are herein incorporated by reference in their entireties.

TECHNICAL FIELD

The present subject matter relates generally to the field of autonomous vehicles, and more particularly, but not exclusively to a method and a system for lane tracking for an autonomous vehicle.

BACKGROUND

Nowadays, automotive industries have started to move towards autonomous vehicles. Autonomous vehicles, as used in this description and claims, are vehicles that are capable of sensing environment around them in order to move on the roads with or without human intervention. The autonomous vehicles sense the environment with the help of sensors configured in the autonomous vehicles such as Laser, Light Detection and Ranging (LIDAR), Global Positioning System (GPS), computer vision and the like. The autonomous vehicles highly rely on lane detection and tracking on the road for navigating smoothly.

Existing lane detection and tracking techniques may use Kalman filters for tracking the lane boundaries. Especially, Kalman filters may be used to predict lane parameters and to smooth the output of a lane tracker which tracks the lane boundaries. Generally, Kalman filters are opted while tracking lane boundaries as the Kalman filter has the capability of estimating dynamics of state vectors, even in the presence of noisy measurements or noisy processes. Major parameters that help in determining the Kalman filter are process noise covariance matrix (Q) and measurement noise covariance matrix (R). The existing lane detection and tracking techniques that rely on Kalman filters for tracking lane boundaries, use predefined or fixed Q and R values for determining Kalman filters. In reality, Q and R are dynamically varying parameters based on scenarios, detectors used for measurement, kind of process used for measurement and tracking, and the like. However, the existing techniques fail to incorporate dynamic nature of Q and R, and instead use fixed or predefined values for Q and R, which affects the accuracy of prediction performed based on the Kalman filters for lane tracking. Inaccurate lane tracking may generate incorrect steering commands and warning signals to the autonomous vehicle, which may jeopardize vehicle safety.

Additionally, since Q and R values are fixed in the existing techniques, existing techniques lack the flexibility to incorporate changes occurring in state over time, thus restricting the predictions to only few types or small range of lane structures.

Therefore, there is a need for a method that can perform lane tracking using Kalman filters, with enhanced accuracy and flexibility.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Disclosed herein is a method of training a lane tracking system for an autonomous vehicle. The method comprising receiving, by a lane tracking system, ground truth values corresponding to a plurality of lane boundary detection points and measured values corresponding to the plurality of lane boundary detection points, from a lane boundary detecting system associated with the lane tracking system. Further, the method includes determining, for ground truth clothoid point and measured clothoid point formed using a ground truth set and a measured set, respectively, coefficient values of clothoid parameters, to model lane boundaries of a lane. The ground truth set comprises a subset of continuous lane boundary detection points and the corresponding ground truth values, and the measured set comprises a subset of continuous lane boundary detection points and the corresponding measured values. Thereafter, the method includes determining Kalman filter parameters for the coefficient values of the clothoid parameters determined for the measured clothoid points, to track the lane boundaries of the lane. The Kalman filter parameters are determined using at least one neural network. Upon determining Kalman filter parameters, the method includes updating the coefficient values of the clothoid parameters determined for the measured clothoid point, using the corresponding Kalman filter parameters. Further, the method includes reconstructing the measured clothoid point, using the corresponding updated coefficient values of the clothoid parameters. Each reconstructed measured clothoid point enables the lane tracking system to track the lane boundaries for the autonomous vehicle. Finally, the method includes minimizing a training error based on a difference between the reconstructed measured clothoid point and the corresponding ground truth set, in each cycle, until the training error is below a predefined threshold.

Further, the present disclosure includes a lane tracking system for an autonomous vehicle. The lane tracking system comprising a processor and a memory communicatively coupled to the processor. The memory stores the processor instructions, which, on execution, causes the processor to train the lane tracking system, wherein for training, the processor is configured to receive ground truth values corresponding to a plurality of lane boundary detection points and measured values corresponding to the plurality of lane boundary detection points, from a lane boundary detecting system associated with the lane tracking system. Further, the processor determines, for ground truth clothoid point and measured clothoid point formed using a ground truth set and a measured set, respectively, coefficient values of clothoid parameters, to model lane boundaries of a lane. The ground truth set comprises a subset of continuous lane boundary detection points and the corresponding ground truth values, and the measured set comprises a subset of continuous lane boundary detection points and the corresponding measured values. Thereafter, the processor determines Kalman filter parameters for the coefficient values of the clothoid parameters determined for the measured clothoid points, to track the lane boundaries of the lane. The Kalman filter parameters are determined using at least one neural network. Upon determining Kalman filter parameters, the processor updates the coefficient values of the clothoid parameters determined for the measured clothoid point, using the corresponding Kalman filter parameters. Further, the processor reconstructs the measured clothoid point, using the corresponding updated coefficient values of the clothoid parameters. Each reconstructed measured clothoid point enables the lane tracking system to track the lane boundaries for the autonomous vehicle. Finally, the processor minimizes a training error based on a difference between the reconstructed measured clothoid point and the corresponding ground truth set, in each cycle, until the training error is below a predefined threshold.

Further, the present disclosure discloses a method of lane tracking for an autonomous vehicle. The method comprising receiving, by a lane tracking system, measured values corresponding to the plurality of lane boundary detection points, from a lane boundary detecting system associated with the lane tracking system. Thereafter, the method includes determining, for a measured clothoid point formed using a measured set, coefficient values of clothoid parameters, to model lane boundaries of a lane. The measured set comprises a subset of continuous lane boundary detection points and the corresponding measured values. Subsequently, the method includes determining Kalman filter parameters for the coefficient values of the clothoid parameters determined for the measured clothoid points, to track the lane boundaries of the lane. The Kalman filter parameters are determined using at least one neural network. Upon determining the Kalman filters, the method includes updating the coefficient values of the clothoid parameters determined for the measured clothoid point, using the corresponding Kalman filter parameters. Finally, the method includes reconstructing the measured clothoid point, using the corresponding updated coefficient values of the clothoid parameters. Each reconstructed measured clothoid point enables the lane tracking system to track the lane boundaries for the autonomous vehicle.

Furthermore, the present disclosure discloses a lane tracking system for an autonomous vehicle. The lane tracking system comprises a processor and a memory communicatively coupled to the processor. The memory stores the processor instructions, which, on execution, causes the processor to receive measured values corresponding to the plurality of lane boundary detection points, from a lane boundary detecting system associated with the lane tracking system. Thereafter, the processor determines, for a measured clothoid point formed using a measured set, coefficient values of clothoid parameters, to model lane boundaries of a lane. The measured set comprises a subset of continuous lane boundary detection points and the corresponding measured values. Subsequently, the processor determines Kalman filter parameters for the coefficient values of the clothoid parameters determined for the measured clothoid points, to track the lane boundaries of the lane. The Kalman filter parameters are determined using at least one neural network. Upon determining the Kalman filters, the processor updates the coefficient values of the clothoid parameters determined for the measured clothoid point, using the corresponding Kalman filter parameters. Finally, the processor reconstructs the measured clothoid point, using the corresponding updated coefficient values of the clothoid parameters. Each reconstructed measured clothoid point enables the lane tracking system to track the lane boundaries for the autonomous vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1 shows an exemplary architecture for performing lane tracking for an autonomous vehicle in accordance with some embodiments of the present disclosure.

DETAILED DESCRIPTION

Figure 2A:
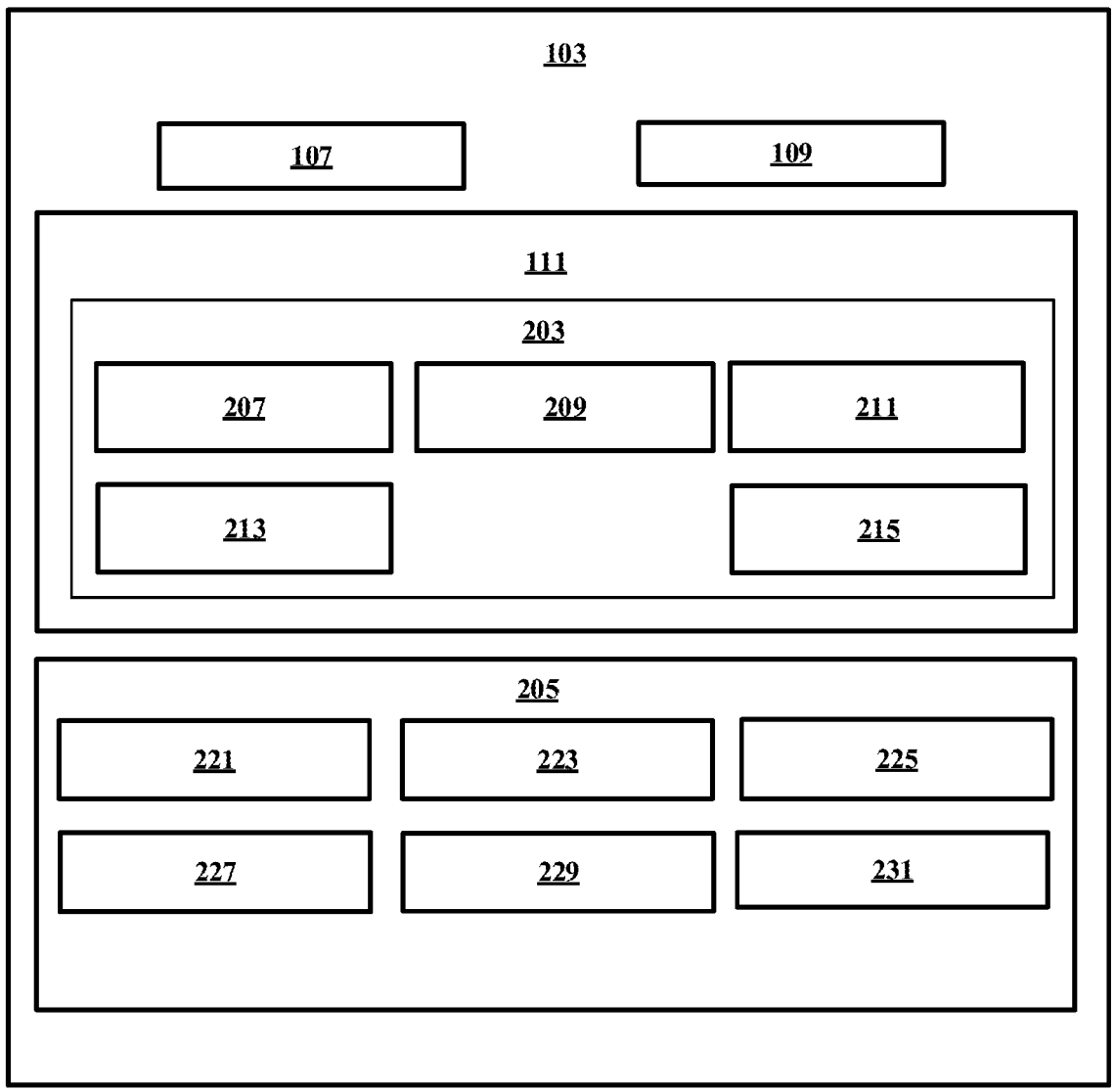
FIG. 2A shows a detailed block diagram of an exemplary lane tracking system for lane tracking for an autonomous vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

In the present document, the word "exemplary" is used herein to mean "serving as an example, instance, or illustration." Any embodiment or implementation of the present subject matter described herein as "exemplary" is not necessarily be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein is a method and a system for lane tracking for an autonomous vehicle. In some embodiments, lane tracking involves detecting presence of one or more lanes on the road along which the autonomous vehicle is moving, and tracking the detected lanes in order to generate one or more commands to the autonomous vehicle. As an example, the one or more commands may be steering commands, braking commands, lane shifting commands, overtaking commands, warning signals and the like, that help in movement of the autonomous vehicle. The present disclosure provides an Artificial Intelligence (AI) based method that performs lane tracking for the autonomous vehicle in a way that it addresses one or more problems of the existing techniques stated in the background section of the present disclosure. Since, the method is an AI based method, a lane tracking system disclosed in the present disclosure for tracking lanes for the autonomous vehicle requires training prior to deployment in a dynamic environment.

In some embodiments, the lane tracking system may be trained using ground truth values corresponding to a plurality of lane boundary detection points along with the measured values corresponding to the plurality of lane boundary detection points determined using image frames corresponding to various on-road scenarios, and different types of lanes. In some embodiments, ground truth values may refer to original values, or in other words, information which is known to be real and provided based on direct observation. However, measured values are the values that are determined or predicted by a system, and are not based on direct observation like the ground truth values. Therefore, the measured values and ground truth values may be same or different, depending on the accuracy of the measured values. In some embodiments, a subset of the measured values may be used to form a measured clothoid point and a subset of ground truth values may be used to form a ground truth clothoid point. During the training phase, the lane tracking system may be trained to determine Kalman filters to update coefficient values of clothoid parameters of the measured clothoid point and then reconstruct the measured clothoid point using the updated coefficient values of the clothoid parameters. Thereafter, the lane tracking system may be trained to determine training error and minimize the training error for each cycle. The training phase of the lane tracking system for tracking lanes for the autonomous vehicle based on clothoid points is explained in detail in the later part detailed description of the present disclosure, with suitable figures.

During the training phase, the lane tracking system may determine Kalman filter parameters using one or more neural networks. The one or more neural networks may include a neural network with temporal memory, such as a recurrent neural network (RNN), or the Long Short-Term Memory (LSTM) neural network. The one or more neural networks may be capable of storing memory associated with historic events and learn long-term dependencies based on the stored memory. In the present disclosure, the lane tracking system may be trained during the training phase to determine a measurement noise covariance matrix (R) and a process noise covariance matrix (Q) dynamically using one or more same or different neural networks. For instance, the measurement noise covariance matrix (R) may be dynamically determined using a first neural network and the process noise covariance matrix (Q) may be dynamically determined using a second neural network. Each of the first neural network and the second neural network may be neural networks with temporal memory, for example, RNN or LSTM networks. In some other embodiments, the measurement noise covariance matrix (R) and the process noise covariance matrix (Q) may be dynamically determined using the same neural network. In reality, Q and R vary dynamically based on scenarios, detectors used for measurement, kind of process used for measurement and tracking, and the like. By using the neural networks to determine Q and R, enables determination of Q and R based on captured historic data from past cycles of the autonomous vehicle, by the neural network. Therefore, the neural network may determine Q and R by analyzing changes over time and hence leads to joint evolution of Q and R. Therefore, the Q and R values determined using the neural network(s) are not some random predefined or static values but are specific to the current scenario captured in the image frame. Since, the Q and R values are determined using the neural networks that are data driven i.e. analyzing based on captured historic data from past cycles and using the analysis results to determine Q and R for the current scenario, the determined values of Q and R are accurate and robust. Moreover, since the neural networks are trained during the training phase using ground truth values along with the measured values, the determined values of Q and R are closer to the ground truth values, which adds to the accuracy levels of the dynamically determined Q and R values. Such dynamically determined accurate Q and R values enable determination of an accurate Kalman filter for lane tracking, that in turn results in accurate updated coefficient values of clothoid parameters and reconstructed measured clothoid point.

The training error that may occur due to the reconstructed clothoid point may be determined based on a difference between the reconstructed clothoid points and the corresponding ground truth set i.e. subset of the ground truth values of corresponding lane boundary detection points, in each cycle. Such training error may be minimized until the training error is below a predefined threshold. Therefore, even the slightest training error that may negatively impact the accuracy of lane tracking is reduced by minimizing the training error during the training phase. In the present disclosure, the training error may be obtained by using L2 norm between the clothoid points and not by using the clothoid coefficients as used in some existing techniques.

Therefore, in the present disclosure, a new way of minimizing error is followed, which involves comparing reconstructed measured clothoid point with ground truth values of corresponding lane boundary detection points initially used for forming the measured clothoid point, that is reconstructed. This enhances the error minimization in a better manner and in lesser number of cycles, when compared to conventional error minimization technique that involves comparing updated coefficient values of the clothoid parameters of the measured clothoid point with the coefficient values of the clothoid parameters of the ground truth clothoid point.

Additionally, since Q and R essentially indicate process noise and measurement noise respectively, determination of Q and R require data from one or more sensors configured in the autonomous vehicle. Usage of the neural network, such as an RNN, or a LSTM network, may provide flexibility to the present disclosure to include a sensor error model in the neural network. Such sensor error model may provide low level features related to the one or more sensors such as amount of noise involved in the measurement, amount of noise involved in the measurement process and the like. Such low level features help in directly correcting the sensor errors using the sensor error model, and result in enhancement in the accuracy of the dynamically determined values of Q and R. This in turn helps in performing lane tracking with utmost accuracy. Therefore, performing lane tracking based on the clothoid parameters using the neural networks and Kalman filters not only enable accurate lane tracking, but also reduce generation of incorrect steering commands and warning signals, and enhancing safety of the autonomous vehicle.

A description of an embodiment with several components in communication with each other does not imply that all such components are required. On the contrary, a variety of optional components are described to illustrate the wide variety of possible embodiments of the disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for lane tracking for an autonomous vehicle in accordance with some embodiments of the present disclosure.

The architecture 100 includes an autonomous vehicle 101, a lane tracking system 103 and a lane boundary detecting system 105, a sensor 1131 to sensor 113n (also referred as one or more sensors 113), and an image capturing device 115. As an example, the autonomous vehicle 101 may be a car, a bus, a truck, a lorry and the like, which are integrated with Electronic Control Units (ECUs) and systems capable of communicating through the in-vehicle network of the autonomous vehicles. In some embodiments, the lane boundary detecting system 105 may be associated with the lane tracking system 103 via a communication network (not shown in the FIG. 1). The communication network may be at least one of a wired communication network and a wireless communication network. In some embodiments, both the lane boundary detecting system 105 and the lane tracking system 103 may be configured in the vehicle 101 to perform lane tracking for the autonomous vehicle 101. In some other embodiments, both the lane boundary detecting system 105 and the lane tracking system 103 may be externally associated with the ECUs of the autonomous vehicle 101 to perform lane tracking for the autonomous vehicle 101. In yet other embodiments, one of the systems may be configured in the autonomous vehicle 101 and the other system may be externally associated with the ECUs of the autonomous vehicle 101 to perform lane tracking for the autonomous vehicle 101.

In some embodiments, the autonomous vehicle 101 may be configured with the one or more sensors 113 and the image capturing device 115. The autonomous vehicle 101 may sense the environment with the help of the one or more sensors 113 such as Laser, Light Detection and Ranging (LIDAR), Global Positioning System (GPS), computer vision and the like. Further, the image capturing device 115 may be mounted to the autonomous vehicle 101, to capture image frames of an area in front of the autonomous vehicle 101. In some embodiments, the image capturing device 115 may include, but not limited to, a Red-Green-Blue (RGB) camera, a monochrome camera, a depth camera, a 360-degree camera, a night vision camera and the like. In some embodiments, the autonomous vehicle 101 may be mounted with more than one image capturing device 115. The image capturing device(s) 115 may be mounted in an area of the autonomous vehicle 101 such that, the area in front of the autonomous vehicle 101 is properly covered in the image frames. For instance, the image capturing device(s) 115 may be mounted on top of the autonomous vehicle 101, in the headlight region of the autonomous vehicle 101, on the external rear view mirrors and the like.

In some embodiments, the lane tracking system 103 is an Artificial Intelligence (AI) based system which may be trained to perform lane tracking for the autonomous vehicle 101 prior to deployment of the lane tracking system 103 for a dynamic environment when the autonomous vehicle 101 is navigating. In some embodiments, during the training phase, the lane tracking system 103 may receive ground truth values corresponding to a plurality of lane boundary detection points and measured values corresponding to the plurality of lane boundary detection points, from the lane boundary detecting system 105. In some embodiments, ground truth values may refer to original values, or in other words, information which is known to be real and provided based on direct observation. However, measured values are the values that are determined or predicted by a system, and are not based on direct observation like the ground truth values. In some embodiments, lane boundaries may be lines that mark the limit of a lane. Each lane may have a left lane boundary and a right lane boundary enclosing the lane. In some embodiments, the plurality of lane boundary detection points may be points that indicate a boundary region of a road along which the autonomous vehicle 101 moves. In other words, the plurality of lane boundary detection points correspond to the left lane boundary and the right lane boundary of a plurality of lanes belonging to a road along which the autonomous vehicle 101 is moving. A subset of continuous lane boundary detection points and the corresponding ground truth values may be referred as a ground truth set and a subset of continuous lane boundary detection points and the corresponding measured values may be referred as a measured set. Thereafter, the lane tracking system 103 may generate a ground truth clothoid point using the ground truth set and a measured clothoid point using the measured set. In some embodiments, during this training phase, the lane tracking system 103 may be trained to select the ground truth set and the measured set required for generating the ground truth clothoid point and the measured clothoid point, respectively. Clothoid points are generally spiral curves whose curvature varies linearly over arc length, that allows a smooth movement of a steering wheel when the autonomous vehicle 101 is moving on road segments with different horizontal curvature. The lane tracking system 103 may be thereafter trained to determine coefficient values of clothoid parameters for the ground truth clothoid point and the measured clothoid point, to model lane boundaries of the lane along which the autonomous vehicle 101 would move. In some embodiments, the clothoid parameters may include, but not limited to, initial curvature of lane boundary ($c_o$), curvature rate ($c_1$) of the lane boundary, and heading angle ($\beta$) with respect to autonomous vehicle's driving direction. In some embodiments, the initial curvature of lane boundary ($c_o$) may be defined as a first curvature angle of the lane determined in an image frame, the curvature rate ($c_1$) of the lane boundary may be defined as rate at which the curvature of the lane is changing in the image frame when compared to the initial curvature, and the heading angle ($\beta$) may be defined as angle of curvature of the lane with respect to the autonomous vehicle on that lane. Thereafter, the lane tracking system 103 may be trained to determine Kalman filter parameters for the coefficient values of the clothoid parameters determined for the measured clothoid points, to track the lane boundaries of the lane. In some embodiments, the lane tracking system 103 may determine the Kalman filter parameters using at least one neural network, such as RNN, or Long Short-Term Memory (LSTM) networks. Upon determining the Kalman filter parameters, the lane tracking system 103 may be trained to update the coefficient values of the clothoid parameters determined for the measured clothoid point, using the corresponding Kalman filter parameters. Thereafter, the lane tracking system 103 may be trained to reconstruct the measured clothoid point using the corresponding updated coefficient values of the clothoid parameters. In some embodiments, each reconstructed measured clothoid point enables the lane tracking system 103 to track the lane boundaries for the autonomous vehicle 101. The lane tracking system 103 may then determine a training error by computing a difference between the reconstructed clothoid point and the corresponding ground truth set. During the training phase, the lane tracking system 103 may minimize the training error determined in each cycle, until the training error is below a predefined threshold.

The lane tracking system 103 thus trained may be used in the dynamic environment when the autonomous vehicle 101 is moving on the road. In some embodiments, the lane tracking system 103 may include a processor 107, an Input/Output (I/O) interface 109 and a memory 111 as shown in the FIG. 1. The I/O interface 109 of the lane tracking system 103 may receive measured values corresponding to the plurality of lane boundary detection points from the lane boundary detecting system 105. The plurality of lane boundary detection points correspond to the left lane boundary and the right lane boundary of the lane along which the autonomous vehicle 101 is moving. The processor 107 may generate a measured clothoid point based on a measured set comprising a subset of continuous lane boundary detection points and the corresponding measured values. In some embodiments, the processor 107 may dynamically select the subset of continuous lane boundary detection points to form the measured set. In some embodiments, the processor 107 may determine coefficient values of clothoid parameters for the measured clothoid point, to model lane boundaries of the lane. Thereafter, the processor 107 may determine Kalman filter parameters for the coefficient values of the clothoid parameters determined for the measured clothoid point, to track the lane boundaries of the lane, and update the coefficient values of the clothoid parameters determined for the measured clothoid point, using the Kalman filter parameters. Finally, the processor 107 may reconstruct the measured clothoid point, using the corresponding updated coefficient values of the clothoid parameters. In some embodiments, each reconstructed measured clothoid point may enable the lane tracking system 103 to track the lane boundaries for the autonomous vehicle 101.

FIG. 2A shows a detailed block diagram of a lane tracking system 103 for an autonomous vehicle in accordance with some embodiments of the present disclosure.

In some implementations, the lane tracking system 103 may include data 203 and modules 205. As an example, the data 203 is stored in a memory 111 of the lane tracking system 103 as shown in the FIG. 2A. In one embodiment, the data 203 may include training data 207, clothoid points data 209, Kalman filter parametric data 211, reconstructed data 213, and other data 215. In the illustrated FIG. 2A, modules 205 are described herein in detail.

In some embodiments, the data 203 may be stored in the memory 111 in form of various data structures. Additionally, the data 203 can be organized using data models, such as relational or hierarchical data models. The other data 215 may store data, including temporary data and temporary files, generated by the modules 205 for performing the various functions of the lane tracking system 103.

In some embodiments, the training data 207 may include, data used for training the lane tracking system 103 for lane tracking of an autonomous vehicle 101. For instance, the training data 207 may include, but not limited to, ground truth values corresponding to a plurality of lane boundary detection points and measured values corresponding to the plurality of lane boundary detection points, ground truth clothoid points and measured clothoid points generated using a ground truth set and a measured set respectively, Kalman filter parameters and coefficient values of clothoid parameters determined for the measured clothoid points, updated coefficient values of the clothoid parameters, reconstructed measured clothoid points, and training errors, that are used for training the lane tracking system 103.

In some embodiments, the clothoid points data 209 may include data related to the clothoid points generated in a dynamic environment, when the autonomous vehicle 101 is moving on the road. As an example, the clothoid points data 209 may include, but not limited to, a measured clothoid point, a measured set comprising a plurality of subset of continuous lane boundary detection points and corresponding measured values used for generating the measured clothoid point, and coefficient values of clothoid parameters determined for the measured clothoid point.

In some embodiments, the Kalman filter parametric data 211 may include, but not limited to, Kalman filter parameters determined for the coefficient values of the clothoid parameters determined for the measured clothoid point, using at least one neural network, which may include RNN, or Short-Term Memory (LSTM) networks.

In some embodiments, the at least one neural network may include a neural network with temporal memory. The neural network with temporal memory may be a special kind of Recurrent Neural Network (RNN), capable of learning long-term dependencies. The at least one neural network may include LSTMs, which are explicitly designed to avoid the long-term dependency problem. All RNNs have the form of a chain of repeating modules of neural network. In standard RNNs, this repeating module will have a very simple structure, such as a single tan h layer. LSTMs also have this chain like structure, but the repeating module of the LSTMs has a different structure when compared to the general RNNs. Instead of having a single neural network layer, there are four neural networks interacting in a special manner. The LSTM has the ability to remove or add information to a cell state, carefully regulated by structures called gates. Gates are a way to optionally let information through. For instance, an LSTM has three of these gates, to protect and control the cell state: (a) Input gate—decides what new information is going to be stored in the cell state, (b) Forget gate—decides what information is going to be thrown away from the cell state, and (c) Output gate—decides what information is going as output.

In some embodiments, the reconstructed data 213 may include, but not limited to, reconstructed measured clothoid point, and updated coefficient values of the clothoid parameters determined for the measured clothoid point that are used for reconstructing the measured clothoid point.

In some embodiments, the data 203 stored in the memory 111 may be processed by the modules 205 of the lane tracking system 103. The modules 205 may be stored within the memory 111. In an example, the modules 205 communicatively coupled to the processor 107 of the lane tracking system 103, may also be present outside the memory 111 as shown in FIG. 2A and implemented as hardware. As used herein, the term modules 205 may refer to an application specific integrated circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, a coefficient value determining module 223, Kalman filter determining module 225, a reconstructing module 227, a learning module 229 and other modules 231. The other modules 231 may be used to perform various miscellaneous functionalities of the lane tracking system 103. It will be appreciated that such aforementioned modules 205 may be represented as a single module or a combination of different modules.

The lane tracking system 103 may be trained to perform lane tracking for the autonomous vehicle 101 prior to deployment of the lane tracking system 103 for a dynamic environment when the autonomous vehicle 101 is navigating.

Figure 2B:
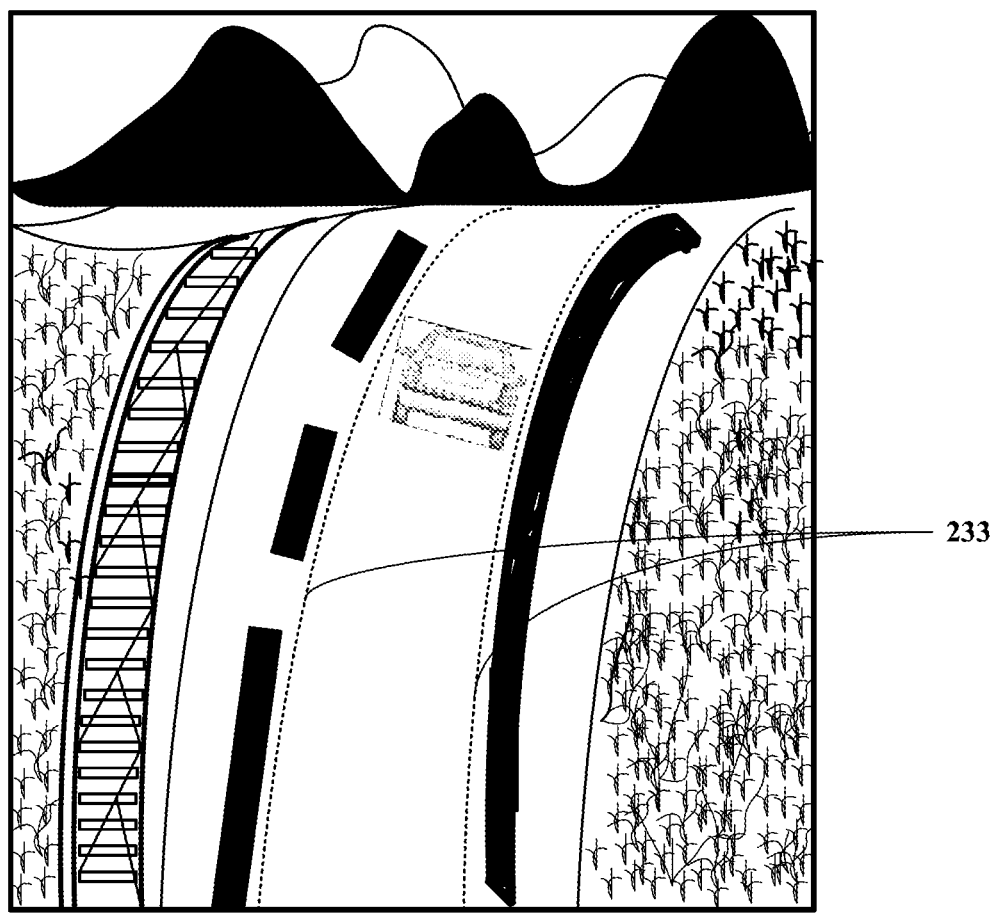
FIG. 2B illustrates exemplary plurality of lane boundary detection points positioned continuously according to exemplary ground truth values in accordance with some embodiments of the present disclosure.
Figure 2C:
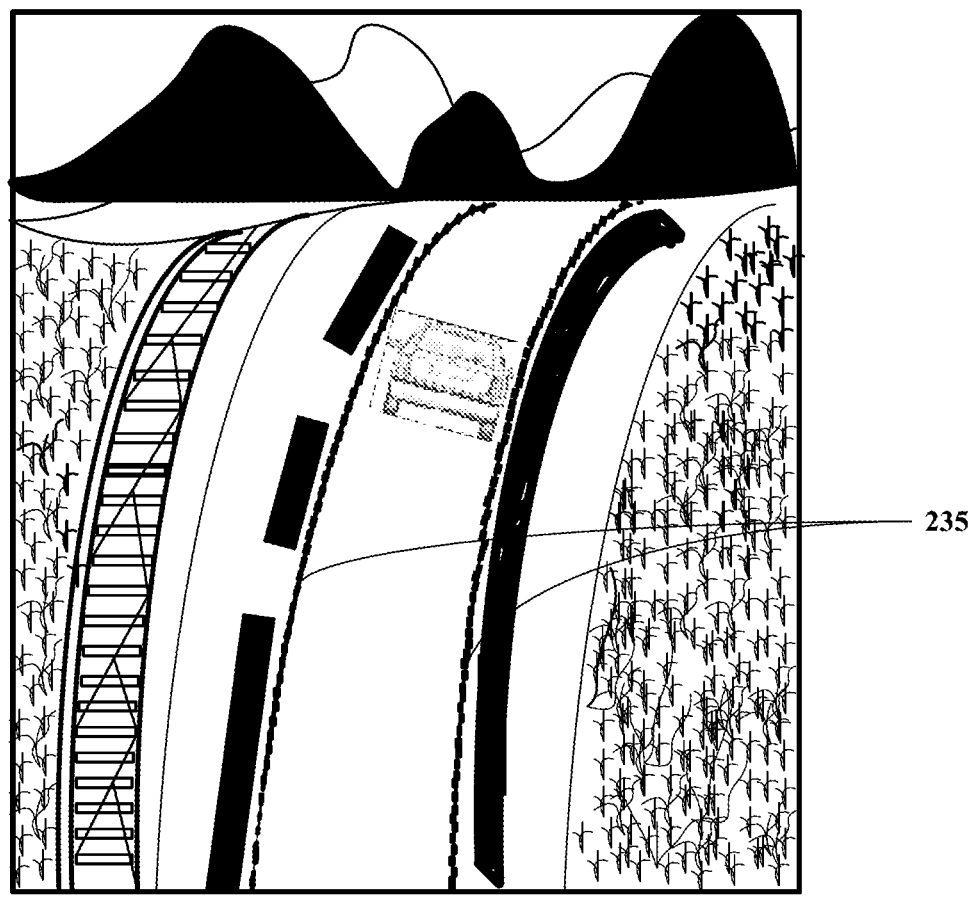
FIG. 2C illustrates exemplary plurality of lane boundary detection points positioned continuously according to exemplary measured values, in accordance with some embodiments of the present disclosure.

In some embodiments, during the training phase, the receiving module 221 may receive ground truth values corresponding to a plurality of lane boundary detection points and measured values corresponding to the plurality of lane boundary detection points, from a lane boundary detecting system 105 associated with the lane tracking system 103. In some embodiments, the plurality of lane boundary detection points correspond to a left lane boundary and a right lane boundary of a plurality of lanes belonging to a road along which the autonomous vehicle 101 is moving. In some embodiments, lane boundary detecting system 105 may determine the plurality of lane boundary detection points using at least one of lane data received from one or more sensors 113 configured in the autonomous vehicle 101 and an image frame of the lane received in real-time. In some embodiments, the image frame of the lane is received from an image capturing device 115 associated with the autonomous vehicle 101. In some other embodiments, the at least one of the lane data and the image frame of the lane are retrieved from a database configured to store the lane data and the image frame captured in real-time. As an example, the lane data may include, but not limited to, lane markings, lane pattern, lane color, number of lanes, and the like. FIG. 2B shows an exemplary figure illustrating exemplary plurality of lane boundary detection points 233 positioned continuously according to exemplary ground truth values. Since the ground truth values corresponding to the exemplary plurality of lane boundary detection points 233 are original values, the lines indicated in white, over the lanes in FIG. 2B, is a smooth line that superimposes properly over the lanes of the road. FIG. 2C shows an exemplary figure illustrating exemplary plurality of lane boundary detection points 235 positioned continuously according to exemplary measured values. Since the measured values corresponding to the exemplary plurality of lane boundary detection points 235 are measured by the lane tracking system 103 which is being trained, the lines indicated in white, over the lanes in FIG. 2B, is not smooth and also does not superimpose over the lanes of the road.

Further, in some embodiments, during the training phase, a coefficient value determining module 223 may select a subset of continuous lane boundary detection points and the corresponding ground truth values as a ground truth set and a subset of continuous lane boundary detection points and the corresponding measured values as a measured set. The coefficient value determining module 223 may generate a ground truth clothoid point using the ground truth set and a measured clothoid point using the measured set. In some embodiments, a clothoid point is generally generated using a predefined number of continuous lane boundary detection points. Therefore, as the autonomous vehicle 101 is moving along a lane of the road, the ground truth sets, and the measured sets will be selected continuously one after the other for generating respective ground truth clothoid points and measured clothoid points. An exemplary ground truth set comprising "N" number of lane boundary detection points of ground truth values may be as shown below:

$$[(x_0,y_0),(x_1,y_1),(x_2,y_2),\ldots,(x_{n-1},y_{n-1})]$$

Similarly, an exemplary ground truth set comprising "M" number of lane boundary detection points of measured values may be as shown below:

$$[(x_0,y_0),(x_1,y_1),(x_2,y_2),\ldots,(x_{m-1},y_{m-1})]$$

Thereafter, during the training phase, a coefficient value determining module 223 may be trained to determine coefficient values of clothoid parameters for the ground truth clothoid point and the measured clothoid point, to model lane boundaries of the lane along which the autonomous vehicle 101 would move. In some embodiments, the clothoid parameters may include, but not limited to, initial curvature of lane boundary ($c_o$), curvature rate ($c_1$) of the lane boundary, and heading angle ($\beta$) with respect to autonomous vehicle's driving direction. In some embodiments, the initial curvature of lane boundary ($c_o$) may be defined as a first curvature angle of the lane determined in an image frame, the curvature rate ($c_1$) of the lane boundary may be defined as rate at which the curvature of the lane is changing in the image frame when compared to the initial curvature, and the heading angle ($\beta$) may be defined as angle along which the autonomous vehicle is expected to move ahead with respect to the curvature of the lane.

In some embodiments, since clothoid points cannot be evaluated in closed form, the coefficient value determining module 223 may be trained to determine the ground truth clothoid point and the measured clothoid point using the below Equation 1.

$$x = \frac{1}{6}c_1 y^3 + \frac{1}{2}c_0 y^2 + \beta y + x_{offset} \qquad \text{Equation 1}$$

In the above Equation 1, x and y refer to lane boundary detection points of one of the ground truth set or the measured set;

$c_o$ refers to initial curvature of lane boundary;

$c_1$ refers to curvature rate of the lane boundary,

β refers to heading angle with respect to autonomous vehicle's driving direction; and $x_{offset}$ refers to initial lateral offset between lane boundaries and the autonomous vehicle 101 (ego vehicle).

In some embodiments, the coefficient value determining module 223 may be trained to determine the coefficient values of clothoid parameters for the ground truth clothoid point using the below Equation 2.

$$\begin{bmatrix} \beta \\ c_0 \\ c_1 \end{bmatrix} = (A^T A)^{-1} A^T \begin{bmatrix} \Delta x_0 \\ \Delta x_1 \\ \vdots \\ \Delta x_{N-1} \end{bmatrix} \qquad \text{Equation 2}$$

In the above Equation 2, A is:

$$\begin{bmatrix} \Delta y_0 & \frac{\Delta y_0^2}{2} & \frac{\Delta y_0^3}{6} \\ \Delta y_1 & \frac{\Delta y_1^2}{2} & \frac{\Delta y_1^3}{6} \\ \vdots & \vdots & \vdots \\ \Delta y_{N-1} & \frac{\Delta y_{N-1}^2}{2} & \frac{\Delta y_{N-1}^3}{6} \end{bmatrix}$$

Delta values of the lane detection boundary points of the ground truth set are determined as shown below:

$$\Delta x_0 = x_1 - x_0 \quad \Delta y_0 = y_1 - y_0$$
$$\Delta x_1 = x_2 - x_1 \quad \Delta y_1 = y_2 - y_1$$

$c_o$ refers to initial curvature of lane boundary;

$c_1$ refers to curvature rate of the lane boundary; and

β refers to heading angle with respect to autonomous vehicle's driving direction.

Using the above Equation 2, the coefficient value determining module 223 may determine coefficient values of clothoid parameters of the measured clothoid point as well. In some embodiments, the coefficient values of clothoid parameters of the ground truth clothoid point and the measured clothoid point represent state of the boundaries of the lane along which the autonomous vehicle 101 is moving during the training phase.

Thereafter, the Kalman filter determining module 225 may be trained to determine Kalman filter parameters for the coefficient values of the clothoid parameters determined for the measured clothoid points, to track the lane boundaries of the lane. In some embodiments, the Kalman filter determining module 225 may determine the Kalman filter parameters using at least one neural network, such as RNN, or Long Short-Term Memory (LSTM) networks. The Kalman filter determining module 225 may determine the Kalman filter parameters using the one or more neural networks. In some embodiments, the Kalman filter determining module 225 may initially provide the coefficient values of the clothoid parameters determined for the measured clothoid point as an input to a first neural network. In some embodiments, the first neural network may be trained based on historical coefficient values of the clothoid parameters determined for clothoid points formed using historical measured and ground truth sets. Thereafter, the Kalman filter determining module 225 may determine a measurement noise covariance matrix (R) using the coefficient values of the clothoid parameters determined for the measured clothoid point, using the first neural network. The first neural network may be capable of learning long-term dependencies. The first neural network may include an RNN, or a LSTM network. Upon determining "R", the Kalman filter determining module 225 may predict a state transition ($Y_p$) of the coefficient values of the clothoid parameters determined for the measured clothoid point, from one image frame to another image frame, based on velocity of the autonomous vehicle 101 moving along the lane and time difference between consecutive image frames. In some embodiments, the state transition may be predicted using the matrix as shown below:

$$\begin{bmatrix} 1 & v\Delta t & \frac{(v\Delta t)^2}{2} \\ 0 & 1 & v\Delta t \\ 0 & 0 & 1 \end{bmatrix}$$

In the above matrix,

"v" refers to velocity of the autonomous vehicle; and

"Δt" refers to time difference between consecutive image frames.

Thereafter, the Kalman filter determining module 225 may determine a process noise covariance matrix (Q) using the predicted state transition as an input to a second neural network. In some embodiments, the second neural network is also trained using historical ego vehicle velocity values and time difference values. The second neural network may be capable of learning long-term dependencies. The second neural network may include an RNN, or a LSTM network. Using the determined process noise covariance matrix (Q), the Kalman filter determining module 225 may predict an error covariance ($P_p$) of the predicted state transition. Finally, the Kalman filter determining module 225 may determine the Kalman filter parameters for the coefficient values of the clothoid parameters determined for the measured clothoid point, based on the predicted state transition ($Y_p$) and covariance ($P_p$), and the determined measurement noise covariance matrix (R) and the coefficient values of the clothoid parameters determined for the measured clothoid point. In some embodiments, broadly, a Kalman filter may include, but not limited to, a state vector (y), a state transition matrix (f), a state error covariance matrix (P), a process noise covariance matrix (Q), a Kalman gain (K), a measurement noise covariance matrix (R), and a measurement (z) (also referred as measured values corresponding to the plurality of lane boundary detection points) at time (t). As discussed above, Kalman filter determining module 225 may learn Q and R using the first and second neural networks, respectively. The below given Equations 1-5 indicate determination of rest of the Kalman filter parameters. Equations 1 and 2 are related to prediction of Kalman filter Parameters and Equations 3-5 are related to updating of Kalman filter parameters.

In the below Equation 1, $\hat{y}'_t$ denotes predicted state vector at time "t" and $f(\hat{y}'_{t-1})$ is a state transition matrix.

$$\hat{y}'_t = f(\hat{y}_{t-1}) \qquad \text{Equation 1}$$

In the below Equation 2, $\hat{P}'_t$ denotes predicted state error covariance matrix at time "t" "$\hat{P}'_{t-1}$" denotes state error covariance matrix determined at time (t−1), "F" is a matrix representation of "f", and "Q" denotes process noise covariance matrix (Q).

$$\hat{P}'_t = F\hat{P}_{t-1}F^T + \hat{Q}_t \qquad \text{Equation 2}$$

In the below Equation 3, $\hat{P}'_t$ denotes predicted state error covariance matrix at time "t", "R" denotes measurement noise covariance matrix, "$K_t$" denotes Kalman gain at time "t".

$$K_t = \hat{P}'_t (\hat{P}'_t + \hat{R}_t)^{-1} \qquad \text{Equation 3}$$

In the below Equation 4, $\hat{y}_t$ denotes updated state vector at time "t", $\hat{y}'_t$ denotes predicted state vector at time "t", "$K_t$" denotes Kalman gain at time "t", and "z" is a measurement corresponding to the plurality of lane boundary detection points at time "t".

$$\hat{y}_t = \hat{y}'_t + K_t(\hat{z}_t - \hat{y}'_t). \qquad \text{Equation 4}$$

In the below Equation 5, $\hat{P}'_t$ denotes predicted state error covariance matrix at time "t", $\hat{P}_t$ denotes updated state error covariance matrix at time "t", "$K_t$" denotes Kalman gain at time "t", and "I" denotes identity matrix.

$$\hat{P}_t = (I - K_t)\hat{P}'_t \qquad \text{Equation 5}$$

Upon determining the Kalman filter parameters, the reconstructing module 227 may be trained to update the coefficient values of the clothoid parameters determined for the measured clothoid point, using the corresponding Kalman filter parameters. As an example, the coefficient values of the clothoid parameters updated based on the Kalman filter parameters may be as shown below:

$$\begin{bmatrix} \beta_{KF} \\ c_{0_{KF}} \\ c_{1_{KF}} \end{bmatrix}$$

In the above example, KF may refer to Kalman Filter Parameter and the clothoid parameters suffixed with "KF" indicated that the determined Kalman filter parameters are applied to the clothoid parameters for updating the coefficient values of the clothoid parameters.

Figure 2D:
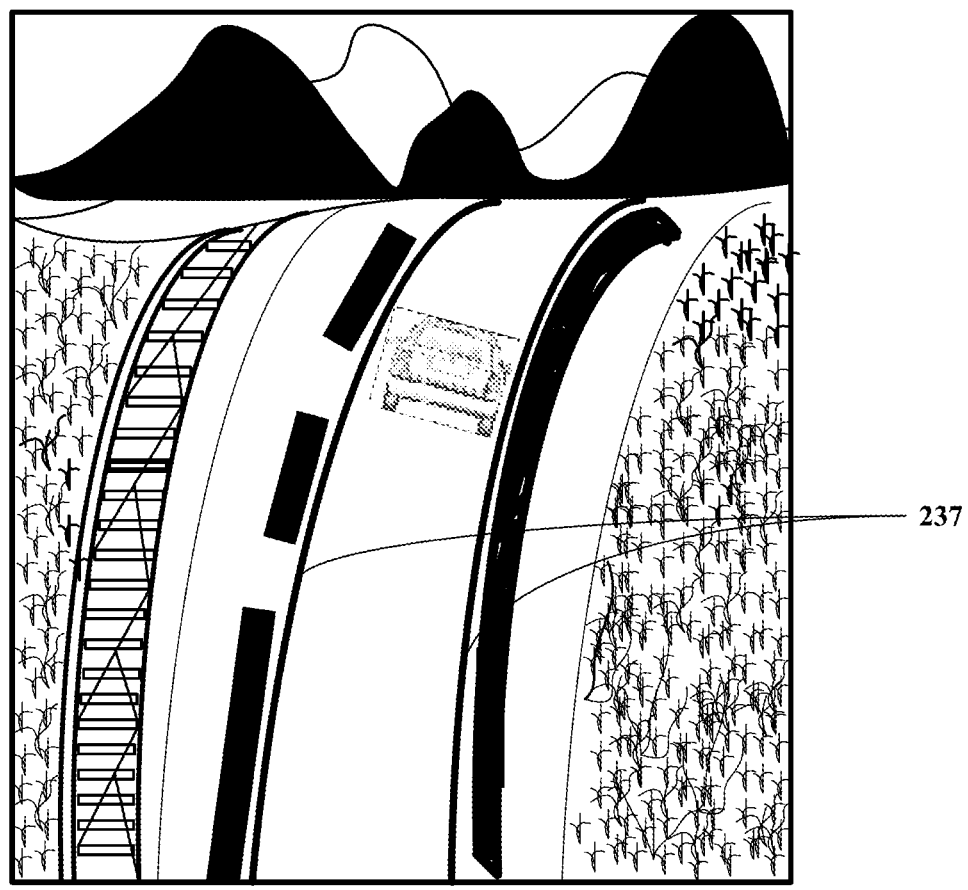
FIG. 2D shows exemplary lanes tracked using exemplary reconstructed clothoid points, in accordance with some embodiments of the present disclosure.
Figure 2E:
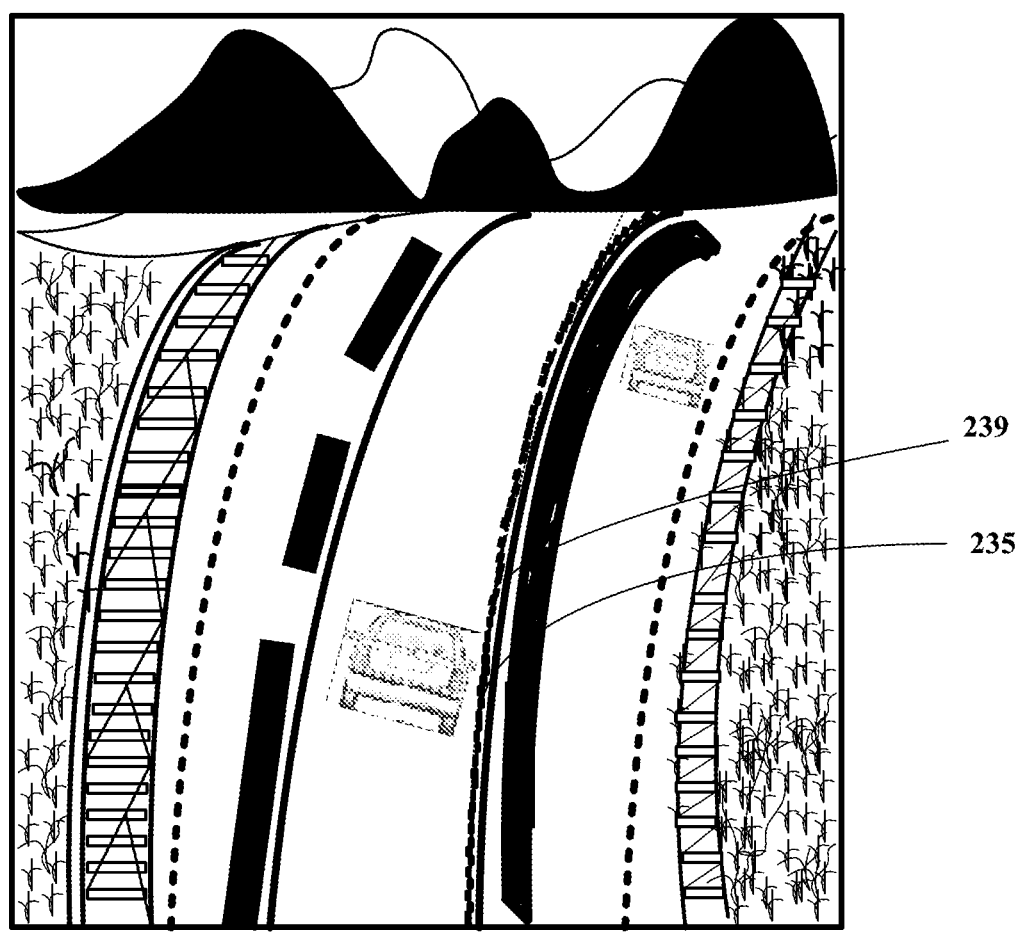
FIG. 2E shows plurality of exemplary lanes tracked, that belong to a road on which the autonomous vehicle is moving, in accordance with some embodiments of the present disclosure.

In some embodiments, upon updating the coefficient values of the clothoid parameters determined for the measured clothoid point, the reconstructing module 227 may be trained to reconstruct the measured clothoid point using the corresponding updated coefficient values of the clothoid parameters. In some embodiments, each reconstructed measured clothoid point may enable the lane tracking system 103 to track the lane boundaries for the autonomous vehicle 101. In some embodiments, the reconstructing module 227 may add an initial lateral offset between the lane boundaries and the ego vehicle, to the reconstructed measured clothoid point. As an example, exemplary tracked and modelled lane 237 formed based on the reconstructed clothoid points is as shown in the FIG. 2D. In a further example, FIG. 2E shows plurality of exemplary lanes tracked, belonging to a road on which the autonomous vehicle 101 is moving. In FIG. 2E, line indicated by referral numeral 235 represents initial measured values corresponding to the exemplary plurality of lane boundary detection points 235, and line indicated by referral numeral 237 represents exemplary tracked and modelled lane 237 formed based on reconstructed measured clothoid points. Therefore, in the present disclosure, the lane tracking system 103 not only tracks the ego lanes, which means left boundary lane and right boundary lane of the lane in which the autonomous vehicle 101 is moving, but also tracks other lanes of the road as shown in the FIG. 2E.

Further, the learning module 229 may determine a training error by computing a difference between the reconstructed clothoid point and the corresponding ground truth set. By computing difference between the reconstructed clothoid point and the corresponding ground truth set, the learning module 229 would be able to enhance the error minimization, thereby leading to accurate determination of reconstructed measured clothoid points for performing lane tracking of the autonomous vehicle 101 when deployed in a dynamic environment. During the training phase, the learning module 229 may minimize the training error determined in each cycle, until the training error is below a predefined threshold.

In some embodiments, the lane tracking system 103 thus trained may be used in the dynamic environment when the autonomous vehicle 101 is moving on the road.

In some embodiments, in the dynamic environment, the receiving module 221 may receive measured values corresponding to the plurality of lane boundary detection points from the lane boundary detecting system 105. The plurality of lane boundary detection points correspond to the left lane boundary and the right lane boundary of the lane along which the autonomous vehicle 101 is currently moving.

Thereafter, the coefficient value determining module 223 may generate a measured clothoid point based on a measured set comprising a subset of continuous lane boundary detection points and the corresponding measured values. In some embodiments, the coefficient value determining module 223 may dynamically select the subset of continuous lane boundary detection points to form the measured set, as the autonomous vehicle 101 is moving on road. The coefficient value determining module 223 may then determine coefficient values of clothoid parameters for the measured clothoid point, to model lane boundaries of the lane.

Further, in some embodiments, the Kalman filter determining module 225 may determine Kalman filter parameters for the coefficient values of the clothoid parameters determined for the measured clothoid point, to track the lane boundaries of the lane. In some embodiments, the Kalman filter determining module 225 may determine the Kalman filter parameters for the coefficient values of the clothoid parameters determined for the measured clothoid point, based on the predicted state transition ($Y_p$) and covariance ($P_p$), the determined measurement noise covariance matrix (R) and the coefficient values of the clothoid parameters determined for the measured clothoid point.

Thereafter, the reconstructing module 227 may update the coefficient values of the clothoid parameters determined for the measured clothoid point, using the Kalman filter parameters. Finally, the reconstructing module 227 may reconstruct the measured clothoid point, using the corresponding updated coefficient values of the clothoid parameters. In some embodiments, each reconstructed measured clothoid point may enable the lane tracking system 103 to track the lane boundaries for the autonomous vehicle 101.

Figure 3A:
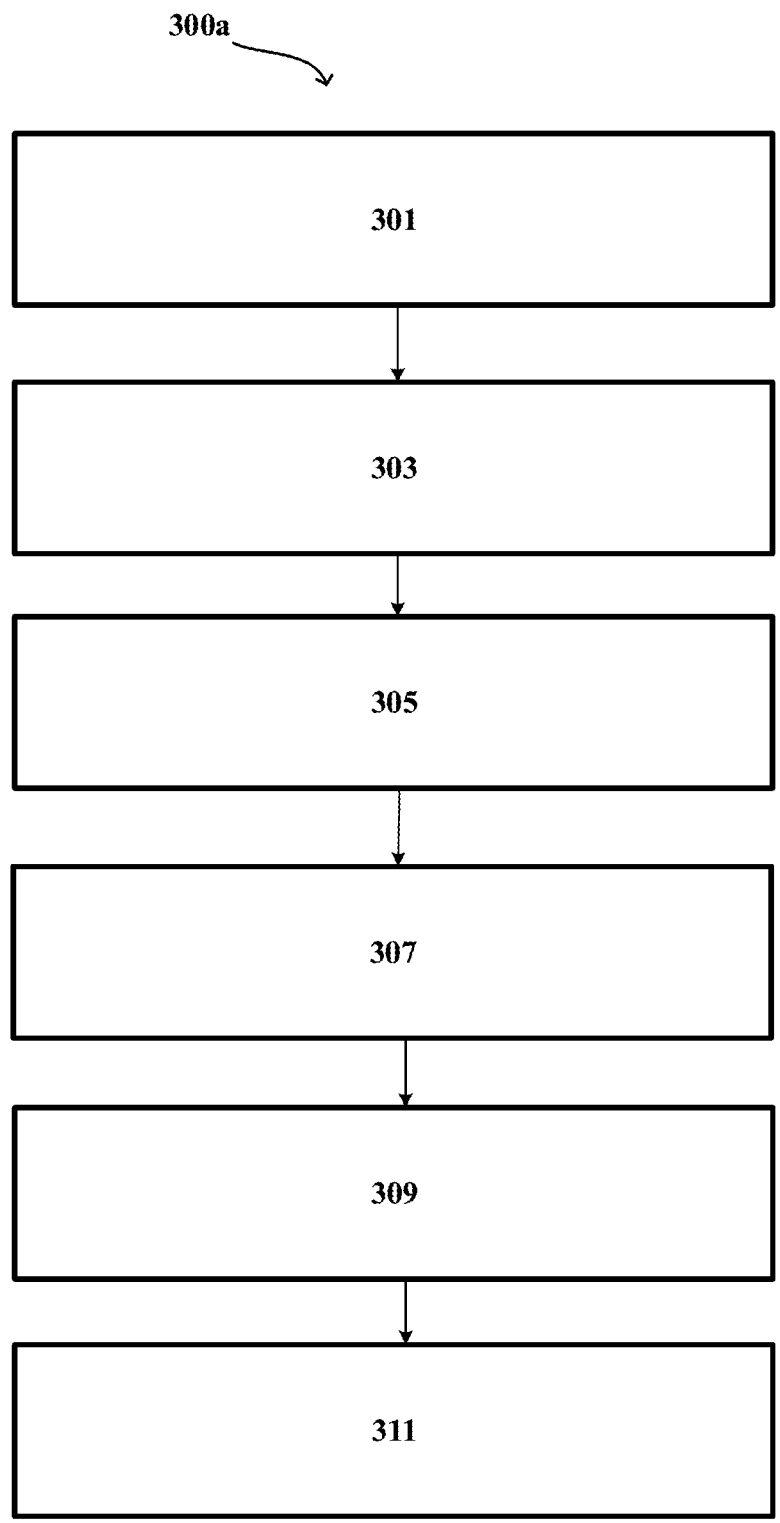
FIG. 3A shows a flowchart illustrating a method of training a lane tracking system for an autonomous vehicle in accordance with some embodiments of the present disclosure.

FIG. 3A shows a flowchart illustrating a method of training a lane tracking system for an autonomous vehicle in accordance with some embodiments of the present disclosure.

As illustrated in FIG. 3A, the method 300a includes one or more blocks illustrating a method of training a lane tracking system for an autonomous vehicle 101. The method 300a may be described in the general context of computer executable instructions. Generally, computer executable instructions can include routines, programs, objects, components, data structures, procedures, modules, and functions, which perform functions or implement abstract data types.

The order in which the method 300a is described is not intended to be construed as a limitation, and any number of the described method blocks can be combined in any order to implement the method 300a. Additionally, individual blocks may be deleted from the methods without departing from the spirit and scope of the subject matter described herein. Furthermore, the method 300a can be implemented in any suitable hardware, software, firmware, or combination thereof.

At block 301, the method 300a may include receiving, by a processor 107 of a lane tracking system 103 during a training phase, ground truth values corresponding to a plurality of lane boundary detection points and measured values corresponding to the plurality of lane boundary detection points, from a lane boundary detecting system 105 associated with the lane tracking system 103. In some embodiments, the plurality of lane boundary detection points are determined using at least one of lane data received from one or more sensors 113 configured in the vehicle 101 and an image frame of the lane received in real-time. In some embodiments, the image frame of the lane is received from an image capturing device 115 associated with the autonomous vehicle 101. In some other embodiments, at least one of the lane data and the image frame of the lane are retrieved from a database configured to store the lane data and the image frame captured in real-time. The database may be associated with the lane tracking system 103.

At block 303, the method 300a may include determining, by the processor 107 during the training phase, coefficient values of clothoid parameters for ground truth clothoid point and measured clothoid point formed using a ground truth set and a measured set, respectively, to model lane boundaries of a lane. In some embodiments, the processor 107 may select a subset of continuous lane boundary detection points and the corresponding ground truth values to form the ground truth set, and a subset of continuous lane boundary detection points and the corresponding measured values to form the measured set. In some embodiments, the number of continuous lane boundary detection points selected to form the ground truth set and the measured set may be predefined. However, the selection is performed by the processor 107 in real-time. In some other embodiments, the number of continuous lane boundary detection points selected to form the ground truth set and the measured set may be decided as per requirement by the processor 107 for each image frame. In some embodiments, the clothoid parameters may include, but not limited to, initial curvature of lane boundary ($c_o$), curvature rate ($c_1$) of the lane boundary, and heading angle ($\beta$) with respect to vehicle's driving direction.

At block 305, the method 300a may include, determining, by the processor 107 during the training phase, Kalman filter parameters for the coefficient values of the clothoid parameters determined for the measured clothoid points, to track the lane boundaries of the lane. In some embodiments, the processor 107 may determine the Kalman filter parameters using neural networks, such as RNN, or Long Short-Term Memory (LSTM) networks.

At block 307, the method 300a may include updating, by the processor 107 during the training phase, the coefficient values of the clothoid parameters determined for the measured clothoid point, using the corresponding Kalman filter parameters.

At block 309, the method 300a includes, reconstructing, by the processor 107 during the training phase, the measured clothoid point, using the corresponding updated coefficient values of the clothoid parameters. In some embodiments, each reconstructed measured clothoid point enables the lane tracking system 103 to track the lane boundaries for the autonomous vehicle 101.

At block 311, the method 300a includes, minimizing, by the processor 107 during the training phase, a training error based on a difference between the reconstructed measured clothoid point and the corresponding ground truth set, in each cycle, until the training error is below a predefined threshold. This way for each cycle, the processor 107 reduces the error involved in tracking lanes using the lane tracking system 103 which is being trained. In some embodiments, the processor 107 may add an initial lateral offset between the lane boundaries and the autonomous vehicle 101, to the reconstructed measured clothoid point.

Figure 3B:
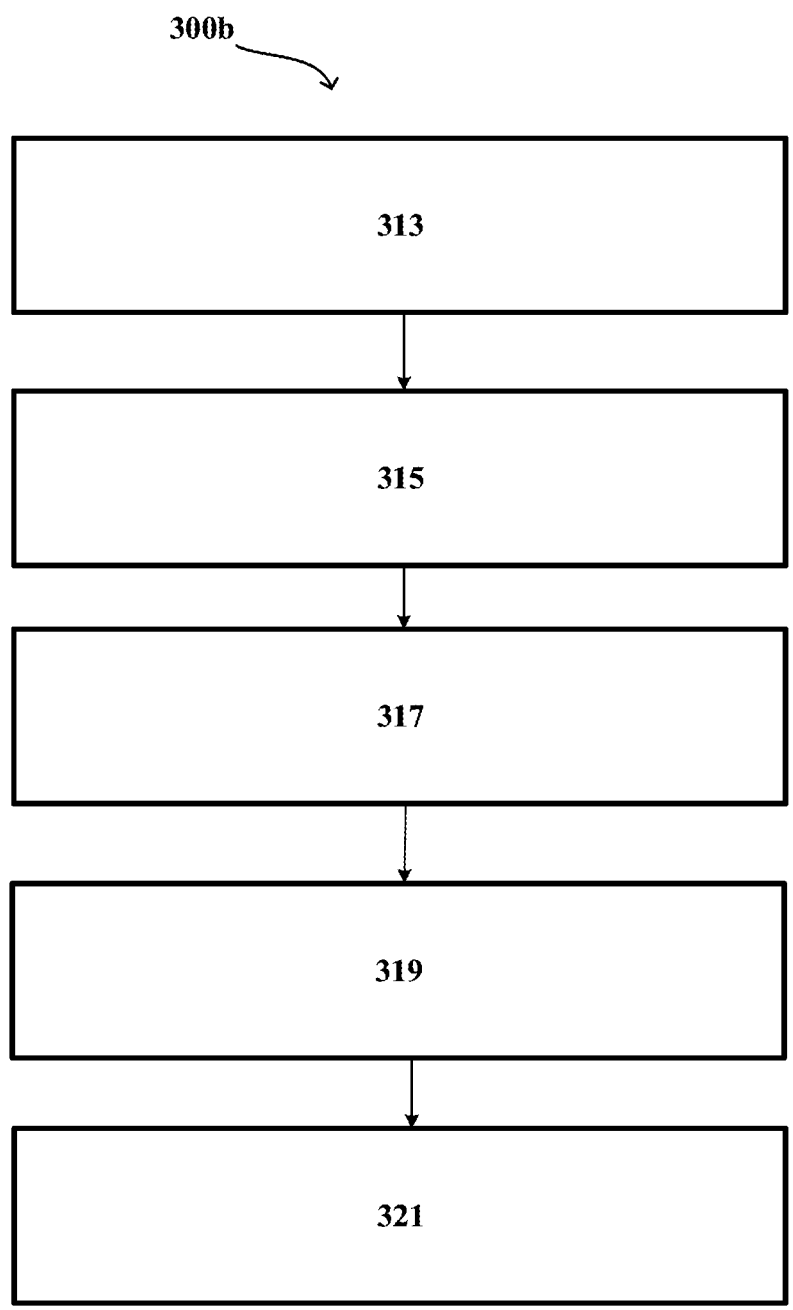
FIG. 3B shows a flowchart illustrating a method of lane tracking system for an autonomous vehicle in accordance with some embodiments of the present disclosure.

FIG. 3B shows a flowchart illustrating a method of lane tracking for an autonomous vehicle in accordance with some embodiments of the present disclosure.

As illustrated in FIG. 3A, the method 300b includes one or more blocks illustrating a method of lane tracking for an autonomous vehicle 101. The method 300b may be described in the general context of computer executable instructions. Generally, computer executable instructions can include routines, programs, objects, components, data structures, procedures, modules, and functions, which perform functions or implement abstract data types.

The order in which the method 300b is described is not intended to be construed as a limitation, and any number of the described method blocks can be combined in any order to implement the method 300b. Additionally, individual blocks may be deleted from the methods without departing from the spirit and scope of the subject matter described herein. Furthermore, the method 300b can be implemented in any suitable hardware, software, firmware, or combination thereof.

At block 313, the method 300b may include receiving, by a processor 107 of a lane tracking system 103 in the dynamic environment when the autonomous vehicle 101 is moving on road, measured values corresponding to the plurality of lane boundary detection points, from a lane boundary detecting system 105 associated with the lane tracking system 103. In some embodiments, the plurality of lane boundary detection points are determined using at least one of lane data received from one or more sensors 113 configured in the autonomous vehicle 101 and an image frame of the lane received in real-time. In some embodiments, the processor 107 may receive image frame of the lane from an image capturing device 115 associated with the autonomous vehicle 101. In some other embodiments, the processor 107 may retrieve at least one of the lane data and the image frame of the lane from a database configured to store the lane data and the image frame captured in real-time. The database may be associated with the lane tracking system 103.

At block 315, the method 300b may include determining, by the processor 107 in the dynamic environment, coefficient values of clothoid parameters for a measured clothoid point formed using a measured set, respectively, to model lane boundaries of a lane. In some embodiments, the processor 107 may select a subset of continuous lane boundary detection points and the corresponding measured values to form the measured set. In some embodiments, the number of continuous lane boundary detection points selected to form the measured set may be predefined. However, the selection is performed by the processor 107 in real-time. In some other embodiments, the number of continuous lane boundary detection points selected to form the measured set may be decided as per requirement by the processor 107 for each image frame. In some embodiments, the clothoid parameters may include, but not limited to, initial curvature of lane boundary ($c_o$), curvature rate ($c_1$) of the lane boundary, and heading angle ($\beta$) with respect to vehicle's driving direction.

At block 317, the method 300b may include, determining, by the processor 107 in the dynamic environment, Kalman filter parameters for the coefficient values of the clothoid parameters determined for the measured clothoid points, to track the lane boundaries of the lane. In some embodiments, the processor 107 may determine the Kalman filter parameters using neural networks capable of learning long-term dependencies, for example, RNN, or Long Short-Term Memory (LSTM) networks.

At block 319, the method 300b may include updating, by the processor 107 in the dynamic environment, the coefficient values of the clothoid parameters determined for the measured clothoid point, using the corresponding Kalman filter parameters.

At block 321, the method 300b includes, reconstructing, by the processor 107 in the dynamic environment, the measured clothoid point, using the corresponding updated coefficient values of the clothoid parameters. In some embodiments, each reconstructed measured clothoid point enables the lane tracking system 103 to track the lane boundaries for the autonomous vehicle 101.

Figure 4:
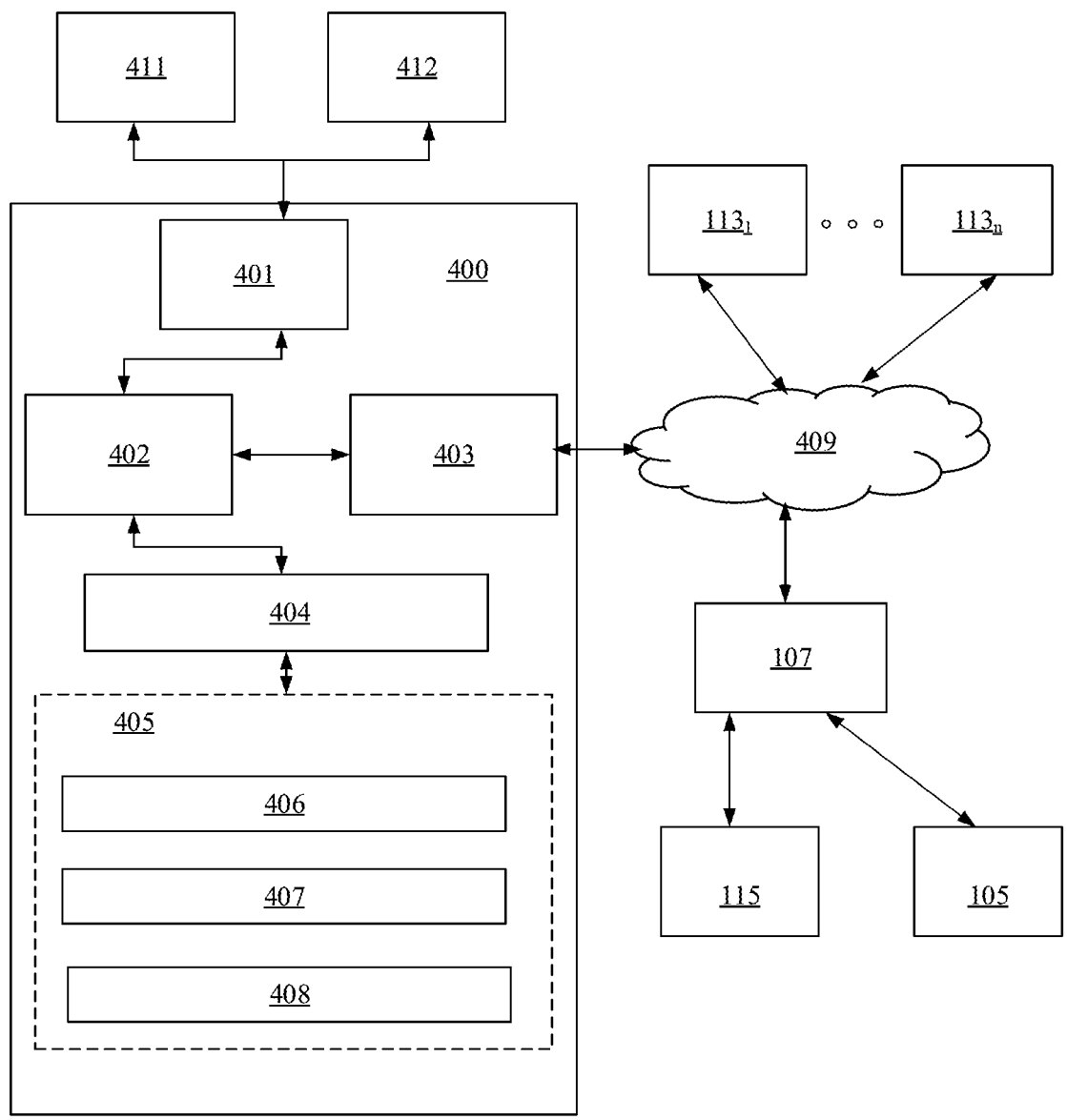
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present disclosure. In some embodiments, the computer system 400 can be a lane tracking system 103 for lane tracking for an autonomous vehicle, as shown in the FIG. 4. The computer system 400 may include a central processing unit ("CPU" or "processor") 402. The processor 402 may include at least one data processor for executing program components for executing user or system-generated business processes. A user may include a person, a person using a device such as those included in this present disclosure, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a lane boundary detecting system 105, one or more sensors 113, and an image capturing device 115. In some embodiments, the lane tracking system 103 may also be associated with a database (not shown in the FIG. 4). The communication network 409 can be implemented as one of the different types of networks, such as intranet or Local Area Network (LAN), Closed Area Network (CAN) and such within the autonomous vehicle. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more sensors 113 may include, but not limited to, Light Detection and Ranging (LIDAR) system, Global Positioning System (GPS), Laser and the like. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this present disclosure. Such databases may be implemented as fault-tolerant, relational, scalable, secure databases such as Oracle or Sybase.

The operating system 407 may facilitate resource management and operation of the computer system 400. Examples of operating systems 407 include, without limitation, APPLE® MACINTOSH® OS X®, UNIX®, UNIXlike system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2ª, MICROSOFT® WINDOWS® (XP®, VISTA®/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces 406 may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE® MICROSOFT® OUTLOOK®, MOZILLA® THUNDERBIRD®, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMS, Digital Video Disc (DVDs), flash drives, disks, and any other known physical storage media.

A description of an embodiment with several components in communication with each other does not imply that all such components are required. On the contrary, a variety of optional components are described to illustrate the wide variety of possible embodiments of the present disclosure. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present disclosure need not include the device itself.

The specification has described a method and a system for lane tracking for an autonomous vehicle 101. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the present disclosure be limited not by this detailed description, but rather by any claims that issue on an application based here on. Accordingly, the embodiments of the present disclosure are intended to be illustrative, but not limiting, of the scope of the invention, which is set forth in the following claims.

REFERRAL NUMERALS

| Reference Number | Description |
| --- | --- |
| 100 | Architecture |
| 101 | Autonomous vehicle |
| 103 | Lane tracking system |
| 105 | Lane boundary detecting system |
| 107 | Processor |
| 109 | I/O interface |
| 111 | Memory |
| 113 | One or more sensors |
| 115 | Image capturing device |

-continued

| Reference Number | Description |
| --- | --- |
| 203 | Data |
| 205 | Modules |
| 207 | Training data |
| 209 | Clothoid points data |
| 211 | Kalman filter parametric data |
| 213 | Reconstructed data |
| 215 | Other data |
| 221 | Receiving module |
| 223 | Co-efficient value determining module |
| 225 | Kalman filter determining module |
| 227 | Reconstructing module |
| 229 | Learning module |
| 231 | Other modules |
| 233 | Exemplary plurality of lane boundary detection points corresponding to measured values |
| 235 | Exemplary plurality of lane boundary detection points corresponding to ground truth values |
| 237 | Exemplary lane tracked and modelled based on reconstructed clothoid points |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

The invention claimed is:

1. A method of training a lane tracking system for an autonomous vehicle to produce a trained lane tracking system, the method comprising:
   receiving, by a lane tracking system, ground truth values corresponding to a plurality of lane boundary detection points and measured values corresponding to the plurality of lane boundary detection points, from a lane boundary detecting system associated with the lane tracking system;
   determining, for ground truth clothoid point and measured clothoid point formed using a ground truth set and a measured set, respectively, by the lane tracking system, coefficient values of clothoid parameters, to model lane boundaries of a lane, wherein the ground truth set comprises a subset of continuous lane boundary detection points and the corresponding ground truth values, and the measured set comprises a subset of continuous lane boundary detection points and the corresponding measured values;
   determining, by the lane tracking system, Kalman filter parameters for the coefficient values of the clothoid parameters determined for the measured clothoid points, to track the lane boundaries of the lane, wherein the Kalman filter parameters are determined using at least one neural network;
   updating, by the lane tracking system, the coefficient values of the clothoid parameters determined for the measured clothoid point, using the corresponding Kalman filter parameters;
   reconstructing, by the lane tracking system, the measured clothoid point, using the corresponding updated coefficient values of the clothoid parameters, wherein each reconstructed measured clothoid point enables the lane tracking system to track the lane boundaries for the autonomous vehicle; and
   minimizing or reducing, by the lane tracking system, a training error based on a difference between the reconstructed measured clothoid point and the corresponding ground truth set, in each cycle, until the training error is below a predefined threshold;
   wherein the trained lane tracking system is configured to control the movement of the autonomous vehicle.

2. The method as claimed in claim 1, wherein the plurality of lane boundary detection points correspond to a left lane boundary and a right lane boundary of the lane.

3. The method as claimed in claim 1, further comprising dynamically selecting, by the lane tracking system, the ground truth set and the measured set required for generating the ground truth clothoid point and the measured clothoid point, respectively.

4. The method as claimed in claim 1, further comprising determining the plurality of lane boundary detection points using at least one of lane data received from one or more sensors configured in the vehicle and an image frame of the lane received in real-time, wherein the image frame of the lane is received from an image capturing device associated with the autonomous vehicle.

5. The method as claimed in claim 4, further comprising retrieving the at least one of the lane data and the image frame of the lane from a database configured to store the lane data and the image frame captured in real-time.

6. The method as claimed in claim 1, wherein the clothoid parameters comprise initial curvature of lane boundary, curvature rate of the lane boundary, and heading angle with respect to vehicle's driving direction.

7. The method as claimed in claim 1, wherein the at least one neural network comprises a neural network with temporal memory.

8. The method as claimed in claim 1, wherein the at least one neural network comprises a recurrent neural network.

9. The method as claimed in claim 1, wherein the at least one neural network comprises a long short-term memory neural network.

10. The method as claimed in claim 1, wherein determining the Kalman filter parameters using the at least one neural networks comprises:
   providing, by the lane tracking system, the coefficient values of the clothoid parameters determined for the measured clothoid point as an input to a first neural network, wherein the first neural network is trained based on historical coefficient values of the clothoid parameters determined for clothoid points formed using historical measured and ground truth sets;
   determining, by the lane tracking system, a measurement noise covariance matrix using the coefficient values of the clothoid parameters determined for the measured clothoid point, using the first neural network;
   predicting, by the lane tracking system, a state transition of the coefficient values of the clothoid parameters determined for the measured clothoid point, from one image frame to another image frame, based on velocity of the autonomous vehicle moving along a lane and time difference between consecutive image frames;
   determining, by the lane tracking system, a process noise covariance matrix using the predicted state transition as an input to a second neural network, wherein the second neural network is trained using historical autonomous vehicle velocity values and time difference values;
   predicting, by the lane tracking system, an error covariance of the predicted state transition using the determined process noise covariance matrix; and determining, by the lane tracking system, the Kalman filter parameters for the coefficient values of the clothoid parameters determined for the measured clothoid point, based on the predicted state transition and covariance, the determined measurement noise covariance matrix and the coefficient values of the clothoid parameters determined for the measured clothoid point.

11. The method as claimed in claim 1, further comprising adding, by the lane tracking system, an initial lateral offset between the lane boundaries and the autonomous vehicle, to the reconstructed measured clothoid point.

12. A method of lane tracking for an autonomous vehicle, the method comprising:
receiving, by a lane tracking system, measured values corresponding to a plurality of lane boundary detection points, from a lane boundary detecting system associated with the lane tracking system;
determining, for a measured clothoid point formed using a measured set, by the lane tracking system, coefficient values of clothoid parameters, to model lane boundaries of a lane, wherein the measured set comprises a subset of continuous lane boundary detection points and the corresponding measured values;
determining, by the lane tracking system, Kalman filter parameters for the coefficient values of the clothoid parameters determined for the measured clothoid points, to track the lane boundaries of the lane, wherein the Kalman filter parameters are determined using at least one neural network;
updating, by the lane tracking system, the coefficient values of the clothoid parameters determined for the measured clothoid point, using the corresponding Kalman filter parameters;
reconstructing, by the lane tracking system, the measured clothoid point, using the corresponding updated coefficient values of the clothoid parameters, wherein each reconstructed measured clothoid point enables the lane tracking system to track the lane boundaries for the autonomous vehicle; and
controlling movement of the automated vehicle based upon the lane tracking system.

13. The method as claimed in claim 12, wherein the at least one neural network comprises at least one of a neural network with temporal memory a recurrent neural network, and a long short-term memory neural network.

14. A training system for training a lane tracking system or lane tracking method that are used to control an autonomous vehicle, the training system comprising:
a processor; and
a memory communicatively coupled to the processor, wherein the memory stores processor instructions, which, on execution, causes the processor to train the lane tracking system, wherein for training, the processor is configured to:
receive ground truth values corresponding to a plurality of lane boundary detection points and measured values corresponding to the plurality of lane boundary detection points, from a lane boundary detecting system associated with the lane tracking system;
determine, for ground truth clothoid point and measured clothoid point formed using a ground truth set and a measured set, respectively, coefficient values of clothoid parameters, to model lane boundaries of a lane, wherein the ground truth set comprises a subset of continuous lane boundary detection points and the corresponding ground truth values, and the measured set comprises a subset of continuous lane boundary detection points and the corresponding measured values;
determine Kalman filter parameters for the coefficient values of the clothoid parameters determined for the measured clothoid points, to track the lane boundaries of the lane, wherein the Kalman filter parameters are determined using at least one neural network;
update the coefficient values of the clothoid parameters determined for the measured clothoid point, using the corresponding Kalman filter parameters;
reconstruct the measured clothoid point, using the corresponding updated coefficient values of the clothoid parameters, wherein each reconstructed measured clothoid point enables the lane tracking system to track the lane boundaries for the autonomous vehicle; and
minimize a training error based on a difference between the reconstructed measured clothoid point and the corresponding ground truth set, in each cycle, until the training error is below a predefined threshold;
wherein the trained lane tracking system or trained method are configured to control the movement of the autonomous vehicle.

15. The training system as claimed in claim 14, wherein the plurality of lane boundary detection points correspond to a left lane boundary and a right lane boundary of the lane.

16. The training system as claimed in claim 14, wherein the processor selects the ground truth set and the measured set required for generating the ground truth clothoid point and the measured clothoid point, respectively, dynamically.

17. The training system as claimed in claim 14, wherein the plurality of lane boundary detection points are determined using at least one of lane data received from one or more sensors configured in the vehicle and an image frame of the lane received in real-time, wherein the image frame of the lane is received from an image capturing device associated with the autonomous vehicle.

18. The training system as claimed in claim 17, wherein the processor retrieves at least one of the lane data and the image frame of the lane from a database configured to store the lane data and the images frame captured in real-time.

19. The training system as claimed in claim 14, wherein the clothoid parameters comprise initial curvature of lane boundary, curvature rate of the lane boundary, and heading angle with respect to vehicle's driving direction.

20. The training system as claimed in claim 14, wherein to determine the Kalman filter parameters using the at least one neural network, the processor is configured to:
provide the coefficient values of the clothoid parameters determined for the measured clothoid point as an input to a first neural network, wherein the first neural network is trained based on historical coefficient values of the clothoid parameters determined for clothoid points formed using historical measured and ground truth sets;
determine a measurement noise covariance matrix using the coefficient values of the clothoid parameters determined for the measured clothoid point, using the first neural network;
predict a state transition of the coefficient values of the clothoid parameters determined for the measured clothoid point, from one image frame to another image frame, based on velocity of the autonomous vehicle moving along a lane and time difference between consecutive image frames;

determine a process noise covariance matrix using the predicted state transition as an input to a second neural network, wherein the second neural network is trained using historical autonomous vehicle velocity values and time difference values;

predict an error covariance of the predicted state transition using the determined process noise covariance matrix; and determine the Kalman filter parameters for the coefficient values of the clothoid parameters determined for the measured clothoid point, based on the predicted state transition and covariance, the determined measurement noise covariance matrix and the coefficient values of the clothoid parameters determined for the measured clothoid point.

* * * * *